US005478033A

United States Patent [19]
Hungerford, Jr.

[11] Patent Number: 5,478,033
[45] Date of Patent: Dec. 26, 1995

[54] PIPE CLAMP

[76] Inventor: Charles S. Hungerford, Jr., Six Beechwood Ct., Woodbury, Conn. 06798

[21] Appl. No.: 229,670
[22] Filed: Apr. 19, 1994
[51] Int. Cl.$^6$ ..................................................... F16L 3/08
[52] U.S. Cl. ........................................................ 248/74.3
[58] Field of Search .............................. 248/74.3, 74.2, 248/74.1, 73, 65, 67.7, 67.5, 316.1, 316.5; 24/20 R, 20 EE, 20 S; 403/397

[56] References Cited

U.S. PATENT DOCUMENTS

| 4,728,071 | 3/1988 | Salacuse ............................ 248/316.5 |
| 4,802,646 | 2/1989 | Cattani ............................. 248/74.2 X |
| 4,955,574 | 9/1990 | Freier ............................... 248/74.2 X |

Primary Examiner—Ramon O. Ramirez
Attorney, Agent, or Firm—Bachman & LaPointe

[57] ABSTRACT

An inventive pipe clamp is disclosed which includes a base having support elements extending outwardly therefrom and a deflection means connected to the support elements for deflecting and facilitating the securement of a pipe in the clamp and the release of the pipe from the clamp. The deflection means may include relief means disposed thereon for facilitating deflection conducive to pipe installation and removal. A deflection means is preferably attached to each of the support elements. The invention also includes two clamp means having upper and lower ends wherein each of the clamp means is preferably attached at its lower end to one of the deflection means. The upper end of each of the clamp means has locking means for connecting the clamp means together. The pipe clamp is preferably formed from a unitary and continuous sheet of metal which allows for lower manufacturing costs and thus, a more economical clamp.

23 Claims, 2 Drawing Sheets

PIPE CLAMP

BACKGROUND OF THE INVENTION

The present invention is directed toward devices for supporting piping, and more particularly to a pipe clamp having a design for easy and economical manufacture which is formed from a unitary and continuous sheet of material.

In the plumbing industry or the like which includes the use of pipes for carrying various fluids such as water, oil, gas and the like, a substantial problem exists in supporting the pipe lines. For example, pipes may run through sewers or the like and the pipes need to be supported on the sewer walls. Difficulties arise in hanging pipe and securing the same because the pipe can be heavy and difficult to hold while trying to attach it to a bracket or clamp or the like on a wall. Accordingly, the piping art includes a variety of piping supports and clamps which can be used for applications requiring easy to use, fast connecting supports. However, as discussed below, the pipe clamp or supports available on the market today are expensive due to the somewhat complex molds used for manufacturing the same.

U.S. Pat. No. 5,118,215 to Freier discloses a pipe clip wherein the pipe clip comprises a baseplate and a pair of arcuate-shaped strap segments having struts pivotally attached thereto for attaching the same to the baseplate. The straps segments include mutually engagable toothed closure tongues on the outer end portions of the same so as to lock the straps in place around the pipe, when in use. When the closure tongues are engaged around the pipe, the straps are symmetrical. As can be seen from the figures, the pipe clip shown in the Freier patent is substantially complex in design. The clip shown therein is preferably formed via a molding process and thus requires a substantially complex mold to be engineered for manufacturing the same. The price for engineering the mold is passed on to the price of the clip and consequently, the clip shown in Freier is reflectively expensive. The clip in Freier could not be manufactured from a unitary sheet of continuous metal or other material due to the non-continuous nature of the design. Accordingly, unlike the instant invention, the pipe clip shown in Freier lacks the ability to be inexpensive to manufacture while meeting fire codes which require metal clips.

U.S. Pat. No. 4,291,855 to Schenkel et al. discloses a pipe clamp. The pipe clamp comprises two clamp segments mounted to an attachment component. The segments can be detachably connected with one another when in their closed position about a pipe. The clamp segments are attached, toward the center of the clamp, to the attachment component by means of respective hinges located between the component and the clamp segments. The clamp segments also include cooperating locking parts for releasably connecting the clamp segments to one another about a pipe. As with the Freier clip, the design showed in Schenkel et al. is also complex and would require a complex mold for manufacturing the same. Thus, the expense of the complex mold is necessarily passed on to the consumer in the price of the pipe clamp, unlike the instant invention. Also unlike the instant invention, it is unlikely that the Schenkel et al. pipe clamp could be manufactured from a sheet of metal. The design is too complex and non-continuous for the formation of the clamp via a continuous sheet of material. While the specification in Schenkel et al. does allude to the possibility of forming the pipe clamp from metal, it is unlikely that the preferred embodiment could be manufactured from a sheet of continuous metal, for obtaining the obvious cost reducing advantages, i.e. decreased manufacturing steps.

Hence, there exists a need in the plumbing and piping arts for a pipe clamp or support which can be efficiently and economically manufactured, which is inexpensive to purchase and which is acceptable for various fire codes.

SUMMARY OF THE INVENTION

The primary object of this invention is to provide a pipe clamp or support which is economical to manufacture and consequently, economical to purchase.

Another object of this invention is to provide a pipe clamp or support which can be economically manufactured from metal so as to meet the requirements of various fire codes.

Still another object of this invention is to provide a pipe clamp or support which can be easily installed under various applications and which provides excellent support and security to piping.

Still another object of this invention is to provide a pipe clamp or support formed from a unitary sheet of material requiring only the manufacturing steps of stamping and forging.

Yet another object of this invention is to provide a pipe clamp or support which is formed from a unitary sheet of material which is designed to bend and conform to configurations which allow for easy installation of piping as well as securely supporting the same.

The foregoing objects are attained by the inventive pipe clamp of the present invention which broadly includes a base having support elements extending therefrom and a deflection means for deflecting and facilitating the securement of the pipe on the clamp and the release of the pipe from the clamp. The deflection means may include both relief means disposed thereon for facilitating the required deflection of the deflection means. A deflection means is preferably attached to each of the support elements. The invention also includes a plurality of clamp means having upper and lower ends wherein each of the clamp means is preferably attached at its lower end to one of the deflection means. The upper end of each of the clamp means has locking means for connecting the clamp means together.

One embodiment of this invention may include the entire pipe clamp being comprised of a single and continuous sheet of metal. Accordingly, the clamp means, deflection means and base including the support means, are sections of the continuous sheet of metal which are distinguishable from each other as separate elements via radial bends separating one element from the other. In this embodiment, the clamp means comprises each of the end sections of the sheet of metal being configured to have a semi-circular shape. This embodiment also includes the deflection means comprising sections of the continuous sheet adjacent the end sections of the sheet. The sections are configured into elongated shapes which extend substantially parallel to the semicircular end sections comprising the clamp means.

Further, this embodiment may also include the base of the pipe clamp being comprised of the central section of the continuous sheet of metal having upwardly extending sections which comprise the support means. The upwardly extending sections are attached and substantially parallel to the elongated shapes which comprise the deflection means. This embodiment may also include the locking means being comprised of a series of ridges spaced in a substantially parallel manner on one of the elongated ends comprising the clamp means and a series of equivalently aligned slots formed within the other of the elongated clamp sections, wherein the ridges and the slots can be engaged for locking the pipe clamp around the pipe. This embodiment may also include the deflection means being substantially spaced from the support elements wherein a clearance is preferably formed between the deflection means and support elements for allowing deflection of the deflection means during the release and securement of the pipe.

The details of the present invention are set out in the following description and drawings wherein like reference characters depict like elements.

DETAILED DESCRIPTION OF THE PREFERRED EMBODIMENT

Figure 1:
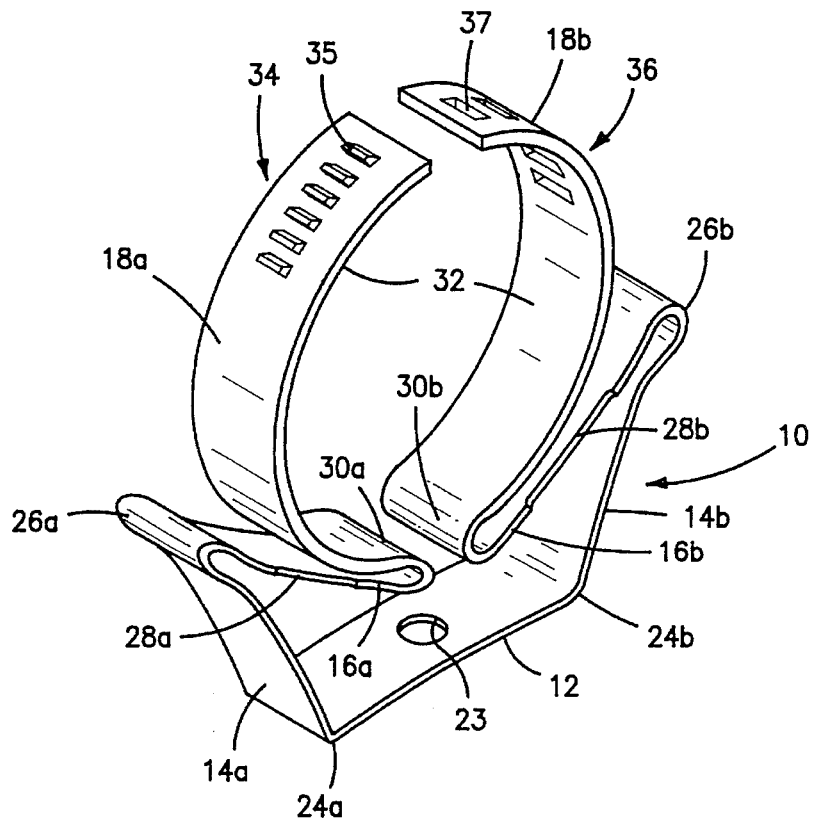
FIG. 1 is a perspective view of the pipe clamp in accordance with the principles of the present invention.

Referring now to the drawings in detail, there is shown in FIG. 1 a perspective view of the pipe clamp in accordance with the principles of the present invention, designated generally as 10. Pipe clamp 10 generally comprises a plurality of sections including base section 12, support element sections 14a and 14b, deflection member sections 16a and 16b, and clamp member sections 18a and 18b.

Figure 2:
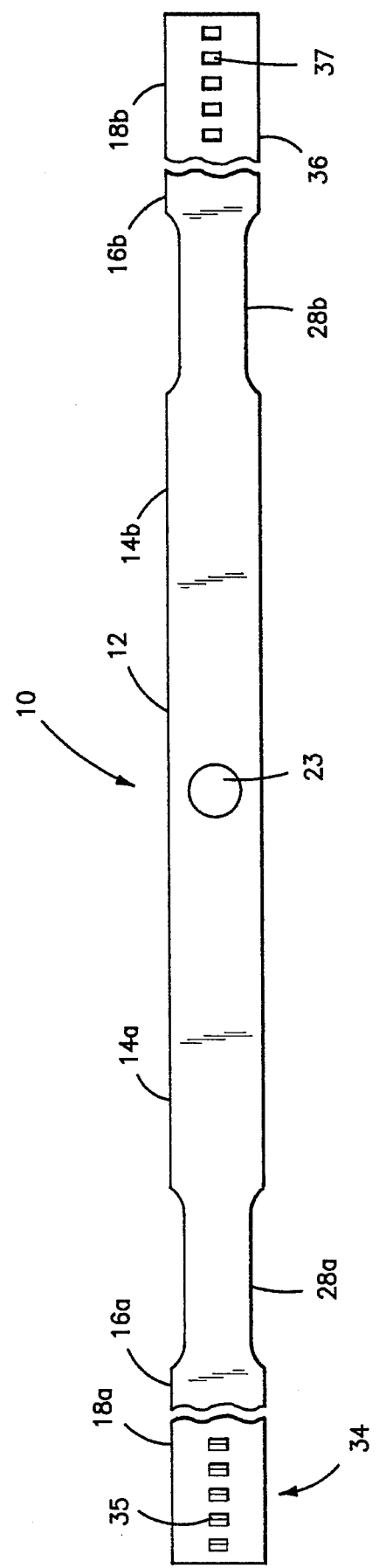
FIG. 2 is an overhead view of a sheet of metal forming the pipe clamp.

Referring now to FIGS. 1 and 2, it is apparent that the pipe clamp of the instant invention is preferably formed from a unitary and continuous strip of metal 20. In the formation of the pipe clamp as shown in FIG. 1, strip of metal 20, shown in FIG. 2, is preferably subjected to several manufacturing steps including forging and stamping. The steps will be discussed more particularly as the individual sections of the pipe clamp are discussed below. It will be apparent that the primary advantage of the pipe clamp disclosed herein lies in the fact that minimal assembly and manufacturing steps are required to form the same.

Figure 3:
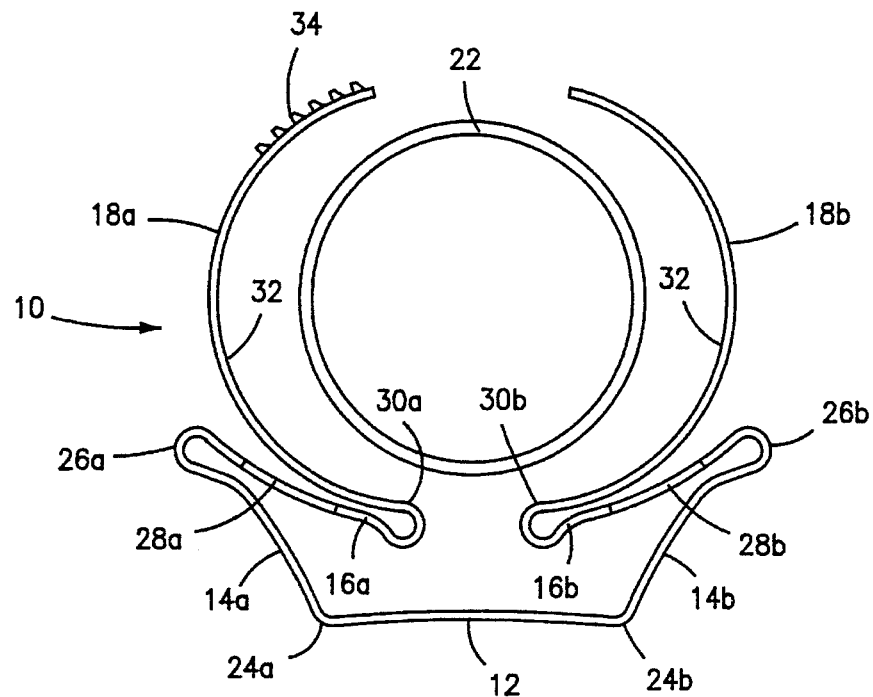
FIG. 3 is a front elevational view of the pipe clamp in accordance with the principles of the present invention showing a pipe being placed into the pipe clamp.

Base section 12 is the simplest section of pipe clamp 10. Base section 12 is preferably comprised of a flat segment of continuous metal strip 20 and is preferably of a size sufficient to support a pipe 22 in pipe clamp 10, as shown in FIG. 3, while pipe clamp 10 is preferably fastened to a surface. The width of base section 12 and the remaining sections of the pipe clamp are substantially equal and can be of any size depending on the amount of support required for the particular application. That is, if heavy piping is used, it may be preferable to use a wider section of continuous metal strip 20, thereby forming a wider base section 12. As shown in FIGS. 1 and 2, base section 12 has a hole 23 therein for receiving a fastener, preferably a bolt, for securing the pipe clamp to a support surface. Hole 23 may also be threaded for receiving a threaded bolt. As shown in the figures, base section 12 is preferably centered on continuous metal strip 20 thereby causing each half of pipe clamp 10 to be substantially the mirror image of the other half. Base plate 12 is preferably separated from the next section, support element sections 14a and 14b, via pivot areas which include radial bends 24a and 24b in continuous strip 20, as shown in FIGS. 1 and 3. In forming radial bends 24a and 24b leading to support element sections 14a and 14b, a forging manufacturing step is preferably used.

Support element sections 14a and 14b, deflection member sections 16a and 16b, and a substantial portion of clamp member sections 18a and 18b are each substantially the same as their counterparts, as indicated by the a and b designations, and therefore, only one element of each set will be described in detail, it being understood that the description applies equally to both elements.

Support element section 14a extends upwardly and outwardly from base section 12, as shown in FIGS. 1 and 2. Support element section 14a is preferably a substantially straight section of continuous metal strip 20 and is preferably segregated from base section 12 via radial bend 24a. Radial bend 24a provides freedom to support element section 14a to flex during the opening and closing of pipe clamp 10 for the installation of pipe 22. Because of the lack of a sharp corner comprising radial bend 24a, the flexing of support element section 14a may occur without damaging the structural integrity of pipe clamp 10. The upper end of support element section 14a includes a radial bend 26a, which is preferably semi-circular in shape and leads into the next section of pipe clamp 10, which is deflection member section 16a. Again, like radial bend 24a, radial bend 26a allows for the bending and deflection of deflection member section 16a in response to the installation or removal of pipe 22. The formation of support element section 14a is also a result of the forging step.

Deflection member section 16a is distinguished from support element section 14a via radial bend 26a, as discussed above. Deflection member section 16a extends downwardly and towards the center of pipe clamp 10 in relation to support element section 14a. Again, deflection member section 16a is preferably substantially a straight section of continuous metal strip 20 which is redirected, as shown in FIG. 1, via radial bend 26a. Deflection member section 16a allows for a substantial portion of the necessary flexibility of pipe clamp 10 in response to the installation and removal of pipe 22 into pipe clamp 10.

In order to enhance flexibility of deflection member section 16a, a relief portion 28a is preferably stamped out of continuous metal strip 20 in deflection member section 16 during the manufacture of pipe clamp 10. Relief portion 28a extends for a substantial portion of deflection member section 16a, preferably a half of the length of the same, and is also preferably centered on the length of deflection member section 16a. Relief portion 28a preferably includes two indents on either side of deflection member section 16a wherein the indents are semi-oval in shape. Therefore, the formation of deflection member section 16a includes the manufacturing steps of both forging and stamping. Deflection member section 16a is distinguishable from the next section to be discussed, clamp member section 18a, via another radial bend 30a. Again, radial bend 30a allows for the deflection of clamp member section 18a in response to the installation and removal of pipe 22.

Clamp member section 18a is preferably semi-circular in shape, and as shown in FIGS. 1 and 3, is preferably used to envelope pipe 22 in conjunction with clamp member section 18b so as to secure pipe 22 in pipe clamp 10. As discussed, clamp member section 18a is segregated from deflection member section 16a via radial bend 30a and is thus allowed sufficient flexibility to deflect. With clamp 10 in the substantially closed orientation, as shown in FIG. 1, clamp member section 18a extends upwardly and inwardly to an apex of clamp 10. In combination with clamp member section 18b, the clamp sections form a substantially circular engagement surface 32 for engaging pipe 22.

Clamp member sections 18a and 18b have been described to this point as substantially similar in structure. However, adjacent the top outer end of each clamp member section 18a and 18b, the sections 18a and 18b include a locking mechanism comprised of an insert portion 34 and an engagement portion 36, respectively. Insert portion 34 includes a plurality of upwardly extending ridges 35 spaced evenly from the upper end of clamp member section 18a and which extend down the longitudinal center of clamp member section 18a. Clamp member section 18b includes the engagement portion which is preferably a series of equivalently spaced slots 37. Slots 37 start from the upper end of clamp member section 18b and extend down the longitudinal center of clamp member section 18b. Slots 37 are meant to engage ridges 35 upon the installation of pipe 22 into pipe clamp 10 as shown in FIG. 3. Slots 37 lock onto ridges 35 so as to securely hold pipe 22 therein. It is preferable also that ridges 35 have angular lead-in sides, shown in FIGS. 1 and 3, which face slots 37 so that slots 37 may easily slide onto and over ridges 35.

Pipe clamp 10 is designed to be flexible, and responsive to the installation of pipe 22. The design is preferably such that the sections forming pipe clamp 10 are rigid for securely holding pipe 22 while being flexible and responsive enough to adjust to the installation of the same. Therefore, the overall shape of pipe clamp 10 is as important as the individual sections comprising pipe clamp 10. As shown in FIG. 3, deflection member sections 16a and 16b are suspended above base 12 and supported in that position via the angular orientation and rigid nature of both support element sections 14a and 14b and deflection member sections 16a and 16b.

Pipe clamp 10 can be opened as shown in FIG. 3 by simply separating the upper ends of clamp member sections 18a and 18b. As this separation step is performed, deflection member sections 16a and 16b as well as radial bends 30a and 30b move upwardly relative to base 12. Due to the exaggerated radial nature of bends 30a and 30b, upon this upward movement, radial bends 30a and 30b extend above the would be natural downward circular course of clamp member sections 18a and 18b. This upward extension facilitates the clamping of pipe clamp 10 around pipe 22 as it is installed. That is, as pipe 22 is pushed downwardly upon upwardly extending radial bends 30a and 30b, clamp member sections 18a and 18b are responsive, moving inwardly and enveloping pipe 22 causing ridges 35 and slots 37 to engage thus locking pipe clamp 10 around pipe 22.

Therefore, pipe clamp 10 can be used preferably by first securing base 12 to a support surface via fastener hole 23. Once secured on the support surface, and prior to attempting to install pipe 22, clamp member sections 18a and 18b should be widely separated as shown in FIG. 3. Because of the responsive material properties of the sheet metal used, pipe clamp 10 will remain in this open position but return to substantially the original shape after installation of pipe 22. With pipe clamp 10 in the open position, as shown in FIG. 3, and with radial bends 30a and 30b positioned upward relative to the bottom portion of clamp member sections 18a and 18b, as discussed above, pipe 22 is preferably placed between clamps member sections 18a and 18b and pushed against radial bends 30a and 30b. As pipe 22 is pushed against radial bends 30a and 30b, deflection member sections 16a and 16b move downward while support element sections 14a and 14b move inward, thereby returning pipe clamp 10 to its original configuration, as shown in FIG. 1. Continued pushing of pipe 22 against radial bends 30a and 30b will cause slots 37 to engage ridges 35 so as to lock clamp member sections 18a and 18b together around pipe 22. Accordingly, pipe 22 is securely installed within pipe clamp 10.

The primary advantage of this invention is that a pipe clamp or support is provided which is economical to manufacture and thus, economical to purchase. Another advantage of this invention is that a pipe clamp is provided which can be economically manufactured from metal so as to meet the requirements of various fire codes. An additional advantage is that a pipe clamp or support is provided which can be easily installed under various applications and which provides excellent support and security to piping. An additional advantage is that a pipe clamp is provided which is formed from a unitary sheet of metal requiring only the manufacturing steps of stamping and forging, and which is properly designed to bend and conform to configurations which allow for easy installation of piping as well as reliably securing the same.

It is apparent that there has been provided in accordance with this invention a pipe clamp which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A pipe clamp for supporting a pipe, comprising:
    a base;
    deflection means for deflecting and facilitating the securement of said pipe in said clamp and the release of said pipe, from said clamp, wherein said deflection means is attached to said base; and
    a plurality of clamp means for engaging said pipe, each of said clamp means having upper and lower ends, wherein each of said clamp means is attached at said lower end to one of said deflection means and said clamp means has locking means adjacent said upper ends for facilitating the engagement of one clamp means with another wherein said clamp means, deflection means and said base are distinguishable from each other as separate elements of said clamp having separate functions, via a plurality of bends separating one element from the other, and the respective shapes of said elements.

2. The pipe clamp according to claim 1, wherein said pipe clamp is formed from a unitary and continuous sheet of material.

3. The pipe means according to claim 1, wherein said deflection means includes pivot means comprising radial ends which connect said deflection means to said base and to said clamp means.

4. The pipe clamp according to claim 2, wherein said clamp means are comprised of end sections of said sheet configured into having semicircular shapes.

5. The pipe clamp according to claim 2, wherein said deflection means are comprised of sections of said sheet adjacent end sections of said sheet being configured into elongated shapes which extend substantially parallel to said clamp means.

6. The pipe clamp according to claim 2, wherein said base is comprised of a substantially flat central section of said sheet.

7. The pipe clamp according to claim 1, wherein said deflection means includes relief means disposed thereon for facilitating the deflection of said deflection means.

8. The pipe clamp according to claim 7, wherein said relief means comprises a portion of said deflection means which has a lesser width than another portion of said deflection means.

9. The pipe clamp according to claim 1, wherein said base includes support elements extending therefrom and said deflection means comprise elongated sections of material extending between said support elements and said clamp means.

10. The pipe clamp according to claim 9, wherein said deflection means extend substantially parallel to said clamp means.

11. The pipe clamp according to claim 1, wherein said locking means comprises a series of ridges spaced on one of said clamp means and a series of equivalently aligned slots formed within another of said clamp means, wherein said ridges and said slots can be engaged for locking said pipe clamp around said pipe.

12. A pipe clamp for supporting a pipe, comprising:
a base includes support elements extending therefrom;
deflection means for deflecting and facilitating the securement of said pipe in said clamp and the release of said pipe from said clamp, wherein said deflection means is attached to said base; and
a plurality of clamp means for engaging said pipe, each of said clamp means having upper and lower ends, wherein each of said clamp means is attached at said lower end to one of said deflection means and said clamp means has locking means adjacent said upper ends for facilitating the engagement of one clamp means with another wherein said deflection means comprises elongated sections of material extending between said support elements and said clamp means wherein said deflection means extends substantially parallel to said clamp means.

13. The pipe clamp according to claim 12, wherein a substantial portion of said deflection means is spaced from said clamp means, forming a clearance therebetween for allowing the deflection of said clamp means during the release and securement of said pipe via said pipe clamp.

14. The pipe clamp according to claim 12, wherein a substantial portion of said deflection means is spaced from said support elements for forming a clearance therebetween which allows the deflection of said defection means during the release and securement of said pipe via said pipe clamp.

15. A pipe clamp for supporting a pipe, comprising:
a base;
deflection means for deflecting and facilitating the securement of said pipe in said clamp and the release of said pipe from said clamp, wherein said deflection means is attached to said base wherein said deflection means includes relief means for facilitating increased deflection of said deflection means, said relief means comprises a portion of said deflection means which has a lesser width than another portion of said deflection means;
clamp means for engaging said pipe, wherein said clamp means has upper and lower ends and is attached adjacent said lower end to said deflection means; and
locking means adjacent said upper end of said clamp means for connecting said clamp means to another of said clamp means;
wherein said pipe clamp is formed from a unitary and continuous sheet of material.

16. The pipe clamp according to claim 15, wherein a substantial portion of said deflection means is spaced from said base, forming a clearance therebetween which allows the deflection of said defection means during the release and securement of said pipe via said pipe clamp.

17. The pipe clamp according to claim 15, wherein said clamp means, deflection means and said base are distinguishable from each other as separate elements of said clamp having separate functions, via a plurality of bends separating one element from the other, and the respective shapes of said elements.

18. The pipe clamp according to claim 15, wherein a substantial portion of said deflection means is spaced from said clamp means, forming a clearance therebetween for allowing the deflection of said clamp means during the release and securement of said pipe via said pipe clamp.

19. A pipe clamp for supporting a pipe, comprising:
a base;
deflection means for deflecting and facilitating the securement of said pipe in said clamp and the release of said pipe from said clamp, wherein said deflection means is attached to said base;
clamp means for engaging said pipe, wherein said clamp means has upper and lower ends and is attached adjacent said lower end to said deflection means; and
locking means adjacent said upper end of said clamp means for connecting said clamp means to another of said clamp means;
wherein said pipe clamp is formed from a unitary and continuous sheet of material wherein a substantial portion of said deflection means is spaced from said clamp means, forming a clearance therebetween for allowing the deflection of said clamp means during the release of securement of said pipe via said pipe clamp.

20. A pipe clamp for supporting a pipe, comprising:
a base;
deflection means for deflecting and facilitating the securement of said pipe in said clamp and the release of said pipe from said clamp, wherein said deflection means is attached to said base;
clamp means for engaging said pipe, wherein said clamp means has upper and lower ends and is attached adjacent said lower end to said deflection means; and
locking means adjacent said upper end of said clamp means for connecting said clamp means to another of said clamp means;
wherein said pipe clamp is formed from a unitary and continuous sheet of material wherein said clamp means, deflection means and said base are distinguishable from each other as separate elements of said clamp having separate functions, via a plurality of bends separating one element from the other, and the respective shapes of said elements.

21. A pipe clamp for supporting a pipe, comprising:
a base;
deflection means for deflecting and facilitating the securement of said pipe in said clamp and the release of said pipe from said clamp, wherein said deflection means is attached to said base wherein said deflection means includes relief means disposed thereon for facilitating the deflection of said deflection means, said relief means comprises a portion of said deflection means which has a lesser width than another portion of said deflection means; and
a plurality of clamp means for engaging said pipe, each of said clamp means having upper and lower ends, wherein each of said clamp means is attached at said lower end to one of said deflection means and said clamp means has locking means adjacent said upper ends for facilitating the engagement of one clamp means with another.

22. The pipe clamp according to claim 21, wherein said clamp means, deflection means and said base are distinguishable from each other as separate elements of said clamp having separate functions, via a plurality of bends separating one element from the other, and the respective shapes of said elements.

23. A pipe clamp for supporting a pipe, comprising:

a base;

deflection means for deflecting and facilitating the securement of said pipe in said clamp and the release of said pipe from said clamp, wherein said deflection means is attached to said base; and a plurality of clamp means for engaging said pipe, each of said clamp means having upper and lower ends, wherein each of said clamp means is attached at said lower end to one of said deflection means and said clamp means has locking means adjacent said upper ends for facilitating the engagement of one clamp means with another wherein said deflection means includes pivot means comprising radial ends which connects said deflection means to said base and to said clamp means.

* * * * *